United States Patent
Bar Erez et al.

(10) Patent No.: US 12,456,612 B2
(45) Date of Patent: Oct. 28, 2025

(54) APPARATUS AND METHODS FOR APPLYING VACUUM-PLASMA TREATMENT

(71) Applicant: ADDON OPTICS LTD., Netanya (IL)

(72) Inventors: Arye Bar Erez, Kfar Sirkin (IL); Haim Engler, Hashmonaim (IL); Jed Arkin, Savyon (IL)

(73) Assignee: ADDON OPTICS LTD., Netanya (IL)

( * ) Notice: Subject to any disclaimer, the term of this patent is extended or adjusted under 35 U.S.C. 154(b) by 82 days.

(21) Appl. No.: 18/683,129

(22) PCT Filed: Aug. 9, 2022

(86) PCT No.: PCT/IB2022/057416
§ 371 (c)(1),
(2) Date: Feb. 12, 2024

(87) PCT Pub. No.: WO2023/021372
PCT Pub. Date: Feb. 23, 2023

(65) Prior Publication Data
US 2024/0355594 A1    Oct. 24, 2024

Related U.S. Application Data

(60) Provisional application No. 63/233,567, filed on Aug. 16, 2021.

(51) Int. Cl.
*H01J 37/32* (2006.01)
*B29D 11/00* (2006.01)

(52) U.S. Cl.
CPC .. *H01J 37/32715* (2013.01); *B29D 11/00432* (2013.01); *H01J 2237/182* (2013.01)

(58) Field of Classification Search
CPC .......... H01J 37/32715; H01J 2237/182; B29D 11/00432
See application file for complete search history.

(56) References Cited

U.S. PATENT DOCUMENTS 2,511,329 A    6/1950    Edward
2,759,394 A    8/1956    Evans
(Continued)

FOREIGN PATENT DOCUMENTS

CA    2360230 A1    7/2000
CN    101467076 A    6/2009
(Continued)

OTHER PUBLICATIONS

Decision of Rejection for Chinese Application No. 202080067832.9 mailed Dec. 27, 2023.
(Continued)

*Primary Examiner* — Adam D Houston
(74) *Attorney, Agent, or Firm* — Ballard Spahr LLP

(57) ABSTRACT

Apparatus and methods are described including a vacuum-plasma-jig (20) that receives an object (10) during application of a vacuum plasma-treatment to a first surface (12) of the object 10). A receptacle (22) and base (30) of the vacuum-plasma-jig (20) are shaped such that when the receptacle (22) receives a portion of a second surface (14) of the object (10), there is a hollow space (28) proximate to the portion of the second surface (14) of the object (10). The vacuum-plasma-jig (20) defines a channel (32) therethrough, a first end (34) of the channel (32) opening to an exterior of the vacuum-plasma-jig (20) and a second end (36) of the channel (32) opening to the hollow space (28), a ratio of a length of the channel in mm to a mean cross-sectional area of the channel in square mm being greater than 100:1. Other applications are also described.

29 Claims, 3 Drawing Sheets

(56) References Cited

U.S. PATENT DOCUMENTS

| | | | |
|---|---|---|---|
| 3,628,854 A | 12/1971 | Jampolsky | |
| 3,877,798 A | 4/1975 | Tolar et al. | |
| 3,904,281 A | 9/1975 | Jampolsky | |
| 4,173,606 A | 11/1979 | Kalal et al. | |
| 4,547,049 A | 10/1985 | Cotie | |
| 4,650,275 A | 3/1987 | Jones | |
| 4,781,452 A | 11/1988 | Ace | |
| 4,859,261 A | 8/1989 | Ace | |
| 4,867,553 A | 9/1989 | Frieder | |
| 4,883,548 A | 11/1989 | Onoki | |
| 4,921,626 A | 5/1990 | Rhodenbaugh | |
| 4,923,758 A | 5/1990 | Marks et al. | |
| 4,969,729 A | 11/1990 | Merle | |
| 5,420,651 A | 5/1995 | Kamppeter | |
| 5,478,824 A | 12/1995 | Burns et al. | |
| 5,617,153 A | 4/1997 | Allen et al. | |
| 5,677,751 A | 10/1997 | Gerber | |
| 5,748,279 A | 5/1998 | Glanzbergh | |
| 5,764,333 A | 6/1998 | Somsel | |
| 5,790,227 A | 8/1998 | Rorabaugh | |
| 5,926,250 A | 7/1999 | Mukaiyama et al. | |
| 6,019,470 A | 2/2000 | Mukaiyama et al. | |
| 6,027,214 A | 2/2000 | Graham | |
| 6,139,148 A | 10/2000 | Menezes | |
| 6,170,952 B1 | 1/2001 | La et al. | |
| 6,244,705 B1 | 6/2001 | Ledbetter et al. | |
| 6,258,218 B1 | 7/2001 | Burton | |
| 6,290,354 B1 | 9/2001 | Safran | |
| 6,807,824 B1 | 10/2004 | Miwa | |
| 6,881,269 B2 | 4/2005 | Matsuzawa et al. | |
| 7,036,929 B1 | 5/2006 | Harvey | |
| 7,250,197 B2* | 7/2007 | Rastogi | H01J 37/32532 427/535 |
| 7,934,831 B2 | 5/2011 | Spivey et al. | |
| 8,042,941 B2 | 10/2011 | Alonso et al. | |
| 8,202,392 B2 | 6/2012 | Jiang et al. | |
| 8,702,230 B2 | 4/2014 | Yi et al. | |
| 8,714,739 B2 | 5/2014 | Rouault De Coligny | |
| 9,156,213 B2 | 10/2015 | Qiu et al. | |
| 9,529,118 B2 | 12/2016 | Ryu et al. | |
| 9,733,489 B2 | 8/2017 | Paille et al. | |
| 9,915,830 B2 | 3/2018 | Curley et al. | |
| 9,995,948 B2 | 6/2018 | Arieli et al. | |
| 10,126,571 B2 | 11/2018 | Junkins | |
| 10,437,309 B2 | 10/2019 | Milford | |
| 10,712,591 B2 | 7/2020 | Arieli et al. | |
| 11,378,821 B2 | 7/2022 | Katzman et al. | |
| 11,745,476 B2 | 9/2023 | Katzman et al. | |
| 12,293,937 B2* | 5/2025 | Uchida | H01J 37/32642 |
| 2002/0149739 A1 | 10/2002 | Perrott et al. | |
| 2003/0017340 A1 | 1/2003 | Jiang et al. | |
| 2003/0048405 A1 | 3/2003 | Rivera | |
| 2004/0055994 A1 | 3/2004 | Miwa | |
| 2004/0126587 A1 | 7/2004 | Maki et al. | |
| 2007/0121058 A1 | 5/2007 | Chuang | |
| 2009/0004478 A1 | 1/2009 | Baetzold et al. | |
| 2009/0046242 A1 | 2/2009 | Nicolson et al. | |
| 2010/0007846 A1 | 1/2010 | Fermigier et al. | |
| 2010/0007847 A1 | 1/2010 | Cano et al. | |
| 2010/0193112 A1 | 8/2010 | Bovet et al. | |
| 2010/0208197 A1 | 8/2010 | Carimalo et al. | |
| 2010/0238400 A1 | 9/2010 | Volk | |
| 2010/0239776 A1 | 9/2010 | Yajima et al. | |
| 2010/0259217 A1 | 10/2010 | Fermigier et al. | |
| 2011/0181828 A1 | 7/2011 | Yi et al. | |
| 2012/0013980 A1 | 1/2012 | Begon | |
| 2013/0154906 A1 | 6/2013 | Braun et al. | |
| 2015/0049306 A1 | 2/2015 | Haddadi et al. | |
| 2015/0286070 A1 | 10/2015 | Aikawa | |
| 2016/0161761 A1 | 6/2016 | Quere et al. | |
| 2016/0178934 A1 | 6/2016 | Curley et al. | |
| 2016/0311184 A1 | 10/2016 | Gourraud | |
| 2017/0059885 A1 | 3/2017 | Patel | |
| 2017/0059886 A1 | 3/2017 | Fayolle et al. | |
| 2017/0156587 A1 | 6/2017 | Rifai et al. | |
| 2017/0188813 A1 | 7/2017 | Arnold et al. | |
| 2017/0235130 A1 | 8/2017 | Baker | |
| 2017/0269379 A1 | 9/2017 | Arieli et al. | |
| 2017/0299886 A1 | 10/2017 | Carmon et al. | |
| 2018/0077992 A1 | 3/2018 | Kataoka et al. | |
| 2018/0259794 A1 | 9/2018 | Arieli et al. | |
| 2019/0212564 A1 | 7/2019 | Rousseau et al. | |
| 2019/0324290 A1 | 10/2019 | El-hajal et al. | |
| 2020/0285074 A1 | 9/2020 | Zimanyi | |
| 2020/0301171 A1 | 9/2020 | Arieli et al. | |
| 2021/0280395 A1* | 9/2021 | Matsuura | H01L 21/68742 |
| 2021/0387303 A1 | 12/2021 | Katzman et al. | |
| 2022/0244542 A1 | 8/2022 | Bouchier et al. | |
| 2022/0326547 A1 | 10/2022 | Bakaraju | |
| 2023/0127754 A1 | 4/2023 | Arkin et al. | |
| 2024/0136158 A1* | 4/2024 | Matsuura | H01L 21/6831 |
| 2024/0177975 A1* | 5/2024 | Bae | H01J 37/32449 |
| 2024/0287670 A1* | 8/2024 | Zhang | H01J 37/32899 |
| 2024/0355594 A1* | 10/2024 | Bar Erez | C23C 14/50 |

FOREIGN PATENT DOCUMENTS

| | | | |
|---|---|---|---|
| CN | 101743501 A | 6/2010 | |
| CN | 103197436 A | 7/2013 | |
| CN | 106461978 A | 2/2017 | |
| CN | 206725875 U | 12/2017 | |
| CN | 110515219 A | 11/2019 | |
| CN | 218756020 U * | 3/2023 | |
| EP | 1870738 A2 | 12/2007 | |
| EP | 4159423 A1 | 4/2023 | |
| EP | 3615318 B1 | 8/2023 | |
| GB | 1100148 A | 1/1968 | |
| JP | S4870647 A | 9/1973 | |
| JP | S5336252 B1 | 10/1978 | |
| JP | 01026818 A | 1/1989 | |
| JP | S6426818 U | 2/1989 | |
| JP | 04120927 U | 10/1992 | |
| JP | H058534 U | 2/1993 | |
| JP | H09154479 A | 6/1997 | |
| JP | 2005249842 A | 9/2005 | |
| JP | 2007102057 A | 4/2007 | |
| JP | 2008000676 A * | 1/2008 | G02B 1/10 |
| JP | 2010033070 A | 2/2010 | |
| JP | 2010507834 A | 3/2010 | |
| JP | 2010508552 A | 3/2010 | |
| JP | 2012128458 A | 7/2012 | |
| JP | 2014200943 A | 10/2014 | |
| JP | 2017516161 A | 6/2017 | |
| JP | 2021046606 A * | 3/2021 | H10D 86/441 |
| JP | 2022537025 A | 8/2022 | |
| JP | 2024152434 A * | 10/2024 | |
| KR | 101631796 B1 * | 6/2016 | H01L 21/3065 |
| WO | 0071330 A1 | 11/2000 | |
| WO | 0105578 A1 | 1/2001 | |
| WO | 2003023495 A2 | 3/2003 | |
| WO | WO-2005031830 A1 * | 4/2005 | H01J 37/32458 |
| WO | 2009103359 A1 | 8/2009 | |
| WO | 2013169987 A1 | 11/2013 | |
| WO | 2014084339 A1 | 6/2014 | |
| WO | 2015124574 A1 | 8/2015 | |
| WO | 2015173797 A1 | 11/2015 | |
| WO | 2017042612 A1 | 3/2017 | |
| WO | 2019219627 A1 | 11/2019 | |
| WO | 2021059128 A1 | 4/2021 | |
| WO | 2021161125 A1 | 8/2021 | |
| WO | WO-2021188362 A1 * | 9/2021 | H01J 37/32642 |
| WO | 2021198822 A1 | 10/2021 | |
| WO | WO-2023021372 A1 * | 2/2023 | H01J 37/32715 |
| WO | WO-2023049013 A1 * | 3/2023 | H01J 37/32449 |
| WO | 2024100506 A1 | 5/2024 | |
| WO | WO-2024248477 A1 * | 12/2024 | C23C 14/14 |

OTHER PUBLICATIONS

International Search Report and Written Opinion from International Application No. PCT/IB2023/061107 mailed Feb. 27, 2024.
Non-Final Office Action for U.S. Appl. No. 17/763,351 mailed May 20, 2024.

(56) References Cited

OTHER PUBLICATIONS

Office Action for Japanese Application No. 2022-509599 mailed Feb. 19, 2024.
Decision on Reexamination Rejection for Chinese Application No. 202080067832.9 mailed Dec. 6, 2024,.
Examination Report for Australian Application No. 2020351724 mailed Apr. 4, 2025,.
Examination Report for European Application No. 20786059.4 mailed Mar. 11, 2025.
International Search Report and Written Opinion from International Application No. PCT/IB2024/059588 mailed Feb. 24, 2025.
Non-Final Office Action for U.S. Appl. No. 17/763,351 mailed Jan. 27, 2025.
Non-Final Office Action for U.S. Appl. No. 17/904,036 mailed Apr. 23, 2025.
Non-Final Office Action for U.S. Appl. No. 17/904,269 mailed Apr. 3, 2025.
Office Action for Chinese Application No. 202180019255.0 mailed Mar. 18, 2025.
Office Action for Korean Application No. 10-2022-7014044 mailed Feb. 28, 2025.
Restriction Requirement for U.S. Appl. No. 18/051,140 mailed Apr. 29, 2025.
Corrected Notice of Allowability for U.S. Appl. No. 16/718,448 mailed Jun. 2, 2022.
Corrected Notice of Allowance for U.S. Appl. No. 16/898,954 mailed Mar. 31, 2023.
Decision of Dismissal of Amendment for Japanese Application No. 2017-51246 mailed Aug. 31, 2020.
Decision of Rejection for Chinese Application No. 201580029313.2 mailed Mar. 11, 2020.
Decision of Rejection for Japanese Application No. 2017-51246 mailed Aug. 20, 2020.
Decision to Refuse for European Application No. 15793232.8 mailed Jan. 22, 2019.
Examination Report for Australian Application No. 201260773 mailed Jun. 6, 2019.
Examination Report for Australian Application No. 2020201126 mailed Feb. 11, 2021.
Examination Report for European Application No. 15793232.8 mailed Sep. 15, 2017.
Examination Report for Indian Application No. 201627037817 mailed Oct. 31, 2020.
Examination Report for Indian Application No. 202247051124 mailed Feb. 27, 2023.
Examination Report for Indian Application No. 202248053824 mailed Mar. 1, 2023.
Examination Report for Indian Patent Application No. 2022215264 mailed Jul. 24, 2023.
Extended European Search Report for European Application No. 15793232.8 mailed May 24, 2017.
Extended European Search Report for European Application No. 22206182.2 mailed Feb. 27, 2023.
Hearing Notice for Indian Application No. 201627037817 mailed Nov. 16, 2023.
International Search Report and Written Opinion from International Application No. PCT/IB2020/058844 mailed Dec. 15, 2020.
International Search Report and Written Opinion from International Application No. PCT/IB2021/050759 mailed Jul. 16, 2021.
International Search Report and Written Opinion from International Application No. PCT/IB2021/052164 mailed Sep. 22, 2021.
International Search Report and Written Opinion from International Application No. PCT/IB2022/057416 mailed Nov. 22, 2022.
International Search Report and Written Opinion from International Application No. PCT/IL2015/050475 mailed Sep. 16, 2015.
Invitation to pay Additional Fees for International Application No. PCT/IB2021/050759 mailed Apr. 30, 2021.
Invitation to Pay Additional Fees for International Application No. PCT/IB2021/052164 mailed Jun. 28, 2021.
Issue Notification for U.S. Appl. No. 15/310,356 mailed May 23, 2018.
Issue Notification for U.S. Appl. No. 16/718,448 mailed Jun. 15, 2022.
Issue Notification for U.S. Appl. No. 16/898,954 mailed Jul. 19, 2023.
Minutes of Oral Proceedings for European Application No. 15793232.8 mailed Nov. 27, 2018.
Non-Final Office Action for U.S. Appl. No. 15/976,669 mailed Sep. 9, 2019.
Non-Final Office Action for U.S. Appl. No. 16/718,448 Mailed Dec. 17, 2021.
Non-Final Office Action for U.S. Appl. No. 16/898,954 mailed Oct. 27, 2022.
Notice of Acceptance for Australian Application No. 2015260773 mailed Nov. 13, 2019.
Notice of Allowance for U.S. Appl. No. 15/310,356 mailed Apr. 16, 2018.
Notice of Allowance for U.S. Appl. No. 15/310,356 mailed Jan. 26, 2018.
Notice of Allowance for U.S. Appl. No. 15/976,669 mailed Jan. 10, 2020.
Notice of Allowance for U.S. Appl. No. 15/976,669 mailed Jun. 4, 2020.
Notice of Allowance for U.S. Appl. No. 16/718,448 mailed Mar. 30, 2022.
Notice of Allowance for U.S. Appl. No. 16/898,954 mailed on Mar. 20, 2023.
Notice of Re-examination of Chinese Application No. 201580029313.2 mailed Jul. 29, 2021.
Office Action for Brazilian Application No. 11 2016 026162 3 mailed Feb. 28, 2022.
Office Action for Canadian Application No. 3,151,806 mailed Aug. 9, 2023.
Office Action for Canadian Application No. 3,170,681 mailed Oct. 20, 2023.
Office Action for Chinese Application No. 201580029313.2 mailed May 22, 2019.
Office Action for Chinese Application No. 201580029313.2 mailed Oct. 3, 2019.
Office Action for Chinese Application No. 201580029313.2 mailed Sep. 3, 2018.
Office Action for Chinese Application No. 202080067832.9 mailed Jul. 1, 2023.
Office Action for Japanese Application No. 2017512464 mailed Feb. 27, 2019.
Office Action for Japanese Application No. 2017-512464 mailed Nov. 25, 2019.
Result of Telephone Consultation for European Application No. 15793232.8 mailed Nov. 5, 2018.
Summons to Attend Oral Hearing for European Application No. 15793232.8 mailed Apr. 10, 2018.
Summons to Attend Oral Hearing for European Application No. 15793232.8 mailed May 27, 2021.
U.S. Appl. No. 15/310,356, filed Nov. 10, 2016.
U.S. Appl. No. 15/976,669, filed May 10, 2018.
U.S. Appl. No. 16/718,448, filed Dec. 18, 2019.
U.S. Appl. No. 17/763,351, filed Mar. 24, 2022.
U.S. Appl. No. 17/904,036, filed Aug. 11, 2022.
U.S. Appl. No. 17/904,269, filed Aug. 15, 2022.
U.S. Appl. No. 18/051,140, filed Oct. 31, 2022.
U.S. Appl. No. 61/991,514, filed May 11, 2014.
U.S. Appl. No. 62/906,157, filed Sep. 26, 2019.
U.S. Appl. No. 62/977,313, filed Feb. 16, 2020.
U.S. Appl. No. 63/002,388, filed Mar. 31, 2020.
U.S. Appl. No. 63/002,393, filed Mar. 31, 2020.
U.S. Appl. No. 63/233,567, filed Aug. 16, 2021.
Chou, et al., "Effect of Multiple Antireflection Coatings on Impact Resistance of Hoya Phoenix Spectacle Lenses", Optom Exp Clin, 2006, pp. 86-89.
Meslin, "Opthalmic Optics: Materials and Treatments", Europe Essilor Academy, 2010, 68.

(56) References Cited

OTHER PUBLICATIONS

Notice of Allowance for U.S. Appl. No. 17/763,351 mailed Oct. 1, 2024.
Office Action for Canadian Application No. 3,151,806 mailed Jun. 12, 2024.
Office Action for Canadian Application No. 3,170,681 mailed Aug. 6, 2024.
Office Action for Chinese Application No. 202080067832.9 mailed Oct. 18, 2024.
Office Action for Japanese Application No. 2022-509599 mailed Sep. 11, 2024.

* cited by examiner

APPARATUS AND METHODS FOR APPLYING VACUUM-PLASMA TREATMENT

CROSS-REFERENCE TO RELATED APPLICATIONS

The present application is a U.S. national stage of PCT International Application No. PCT/IB2022/057416 to Bar Erez, filed Aug. 9, 2022 (published as WO 23/021372), entitled "Apparatus and methods for applying vacuum-plasma treatment," which claims priority from U.S. Provisional Patent Application No. 63/233,567 to Bar Erez et al., filed Aug. 16, 2021, entitled "Apparatus and methods for applying vacuum-plasma treatment," which is incorporated herein by reference.

FIELD OF EMBODIMENTS OF THE INVENTION

Some applications of the present invention generally relate to applying vacuum-plasma treatment to a surface. In particular, some applications relate to applying vacuum-plasma treatment to one side of an object.

BACKGROUND

In many industries vacuum-plasma treatment is used in order to clean surfaces on an atomic level, to promote adhesion to such surfaces, and for other purposes (surface activation, deposition, etching, etc.). For example, vacuum-plasma treatment is applied to surfaces to activate the surfaces such as to be receptive to adhesion of a coating, electroplating, painting, etc., in industries including the automotive industry, the packing industry, as well as for medical, and military uses.

Vacuum-plasma treatment is conducted inside a sealed vacuum chamber, in which the surface is exposed to plasma, which is a gas or a mixture of gases that is electrically energized. The exposure of the surface to the energized gases at vacuum pressure can be controlled such as to cause changes to the surface that promote adhesion to the surface.

SUMMARY OF EMBODIMENTS

In accordance with some applications of the present invention, a vacuum-plasma jig is provided for use when applying a vacuum-plasma treatment to an object. The object may include a lens of eyeglasses, a different type of lens (e.g., a lens of machinery, a telescope, a microscope, etc.), a cover of a watch or a clock, a protective cover of a cellphone, or any other type of object. The object is typically made of glass, plastic, crystal, or any other material. For some applications, the object is a curved object that defines a concave surface and a convex surface. The vacuum-plasma jig is typically used in cases when it is desirable to apply a vacuum-plasma treatment to one surface of the object, but not apply the treatment to the other surface (or to a portion thereof). For example, this may be the case if coatings are to be applied to one of the surfaces but not to the other surface (or to a portion thereof). In such cases, it may be preferable not to apply the vacuum-plasma treatment to the other surface (or to a portion thereof) in order to avoid damage to the other surface (or to a portion thereof). By way of example, applying a plasma treatment to a hydrophobic coating layer typically results in damage to the coating that is readily observable.

One possible solution to protecting a surface of an object (or a portion thereof) from plasma treatment would be to cover it with a protective film. However, this is time-consuming and requires the use of disposables. Another possible solution would be to attach a protective chamber to the surface (or portion thereof) that is to be protected such that the vacuum within the vacuum-plasma chamber would give rise to a vacuum seal between the protective chamber and the surface (or a portion thereof). However, the inventors have found that in such cases, after the vacuum plasma treatment has been terminated it is very difficult to remove the surface from the protective chamber because the vacuum that was created during the plasma treatment continues to hold together the protective chamber and the surface, even after an atmospheric pressure is resumed. Adding a small hole to the protective chamber (such that after resuming the atmospheric pressure at the end of the plasma treatment, it also releases the protective chamber from the protected surface) tends not to help because the plasma tends to enter the protective chamber through the hole, such that the plasma may end up damaging the surface (or a portion thereof).

In accordance with some applications of the present invention, a vacuum-plasma jig acts as a protective chamber that protects a surface of an object (or a portion thereof) from the plasma treatment. Typically, the jig defines a long, narrow channel with the dimensions of the channel being such that the strength of any plasma entering the protective chamber is substantially weakened such that it does not damage the surface (or portion thereof) that is to be protected. Further typically, the dimensions of the channel are such that, when vacuum is applied within the vacuum-plasma chamber, the surface (or portion thereof) that is to be protected is substantially sealed with respect to the protective chamber. This is because the vacuum pressure that is applied to the vacuum-plasma chamber is imparted along the channel. Still further typically, the dimensions of the channel are such that, when the vacuum within the vacuum-plasma chamber is terminated, the surface (or portion thereof) that is to be protected is readily removable from the protective chamber, due to the seal between the protective chamber and the surface (or portion thereof) being weakened by inflow of air into the protective chamber via the channel.

There is therefore provided, in accordance with some applications of the present invention, apparatus for use with an object having first and second surfaces and a vacuum-plasma chamber, the apparatus including:

a vacuum-plasma-jig configured to receive the object during application of a vacuum plasma-treatment to the first surface of the object within the vacuum-plasma chamber, the vacuum-plasma jig including:

a receptacle configured to receive at least a portion of the second surface of the object when the second surface is placed upon the receptacle; and a base upon which the receptacle is disposed, the receptacle and base being shaped such that when the receptacle receives the portion of the second surface of the object, there is a hollow space proximate to the portion of the second surface of the object, and the jig defining a channel therethrough, a first end of the channel opening to an exterior of the vacuum-plasma-jig and a second end of the channel opening to the hollow space, a ratio of a length of the channel in mm to a mean cross-sectional area of the channel in square mm being greater than 100:1.

In some applications, the channel is shaped as a spiral.

In some applications, the channel is defined through the base, a first end of the channel opening to an exterior of the base and a second end of the channel opening to the hollow space.

In some applications, the channel includes a tube, a first end of the tube opening to an exterior of the vacuum-plasma-jig and a second end of the tube opening to the hollow space.

In some applications, the channel is configured such that a strength of any plasma entering the hollow space is substantially weakened such that it does not damage the portion of the second surface.

In some applications, the receptacle is configured to receive the entire second surface of the object when the second surface is placed upon the receptacle.

In some applications, the receptacle is covered with a soft material layer that is configured to receive at least the portion of the second surface.

In some applications, the channel is configured such that, when vacuum is applied within the vacuum-plasma chamber, the portion of the second surface is substantially sealed with respect to the receptacle.

In some applications, the channel is configured such that, when the vacuum within the vacuum-plasma chamber is terminated, the portion of the second surface is readily removable from the receptacle, due to sealing between the receptacle and the second surface being weakened by inflow of air into the hollow space via the channel.

In some applications, the object includes a curved object that defines a concave surface and a convex surface.

In some applications, the vacuum-plasma-jig is configured to receive the object during application of the vacuum plasma-treatment to the concave surface of the object within the vacuum-plasma chamber, and the receptacle is configured to receive a portion of the convex surface of the object when the convex surface is placed upon the receptacle.

In some applications, the vacuum-plasma-jig is configured to receive the object during application of the vacuum plasma-treatment to the convex surface of the object within the vacuum-plasma chamber, and the receptacle is configured to receive a portion of the concave surface of the object when the concave surface is placed upon the receptacle.

In some applications, the curved object includes a lens that defines a concave surface and a convex surface, and the vacuum-plasma-jig is configured to receive the lens during application of a vacuum plasma-treatment to the concave surface of the lens within the vacuum-plasma chamber.

In some applications, the curved object includes a lens that defines a concave surface and a convex surface, and the vacuum-plasma-jig is configured to receive the lens during application of a vacuum plasma-treatment to the convex surface of the lens within the vacuum-plasma chamber.

There is further provided, in accordance with some applications of the present invention, a method for use with an object having first and second surfaces, the method including:

placing the object on a receptacle of a vacuum-plasma-jig such that at least a portion of the second surface of the object is received by the receptacle, the vacuum-plasma jig additionally including a base, and the receptacle and base being shaped such that when the receptacle receives the portion of the second surface of the object, there is a hollow space proximate to the portion of the second surface of the object, and the vacuum-plasma jig defining a channel therethrough, a first end of the channel opening to an exterior of the vacuum-plasma-jig and a second end of the channel opening to the hollow space, a ratio of a length of the channel in mm to a mean cross-sectional area of the channel in square mm being greater than 100:1; and applying a vacuum plasma-treatment to the first surface of the object within a vacuum-plasma chamber, while the portion of the second surface of the object is received by the receptacle.

In some applications, the channel is shaped as a spiral.

In some applications, the channel is defined through the base, a first end of the channel opening to an exterior of the base and a second end of the channel opening to the hollow space.

In some applications, the channel includes a tube, a first end of the tube opening to an exterior of the vacuum-plasma-jig and a second end of the tube opening to the hollow space.

In some applications, the channel is configured such that a strength of any plasma entering the hollow space is substantially weakened such that it does not damage the portion of the second surface.

In some applications, the receptacle is configured to receive the entire second surface of the object when the second surface is placed upon the receptacle.

In some applications, the channel is configured such that, when vacuum is applied within the vacuum-plasma chamber, the portion of the second surface is substantially sealed with respect to the receptacle.

In some applications, the channel is configured such that, when the vacuum within the vacuum-plasma chamber is terminated, the portion of the second surface is readily removable from the receptacle, due to sealing between the receptacle and the second surface being weakened by inflow of air into the hollow space via the channel.

In some applications, the object includes a curved object that defines a concave surface and a convex surface.

In some applications, the vacuum-plasma-jig is configured to receive the object during application of the vacuum plasma-treatment to the concave surface of the object within the vacuum-plasma chamber, and the receptacle is configured to receive a portion of the convex surface of the object when the convex surface is placed upon the receptacle.

In some applications, the vacuum-plasma-jig is configured to receive the object during application of the vacuum plasma-treatment to the convex surface of the object within the vacuum-plasma chamber, and the receptacle is configured to receive a portion of the concave surface of the object when the concave surface is placed upon the receptacle.

In some applications, the curved object includes a lens that defines a concave surface and a convex surface, and the vacuum-plasma-jig is configured to receive the lens during application of a vacuum plasma-treatment to the concave surface of the lens within the vacuum-plasma chamber.

In some applications, the curved object includes a lens that defines a concave surface and a convex surface, and the vacuum-plasma-jig is configured to receive the lens during application of a vacuum plasma-treatment to the convex surface of the lens within the vacuum-plasma chamber.

In some applications, placing the object on a receptacle of a vacuum-plasma-jig such that at least a portion of the second surface of the object is received by the receptacle includes placing the object on a soft material layer that is configured to receive at least the portion of the second surface.

In some applications, the method further includes coating the soft material layer with a lubricant prior to placing the object on the receptacle of the vacuum-plasma-jig, the lubricant being configured to form a seal between the portion of the second surface of the object and the soft material layer.

The present invention will be more fully understood from the following detailed description of embodiments thereof, taken together with the drawings, in which:

DETAILED DESCRIPTION OF EMBODIMENTS

Figure 1A:
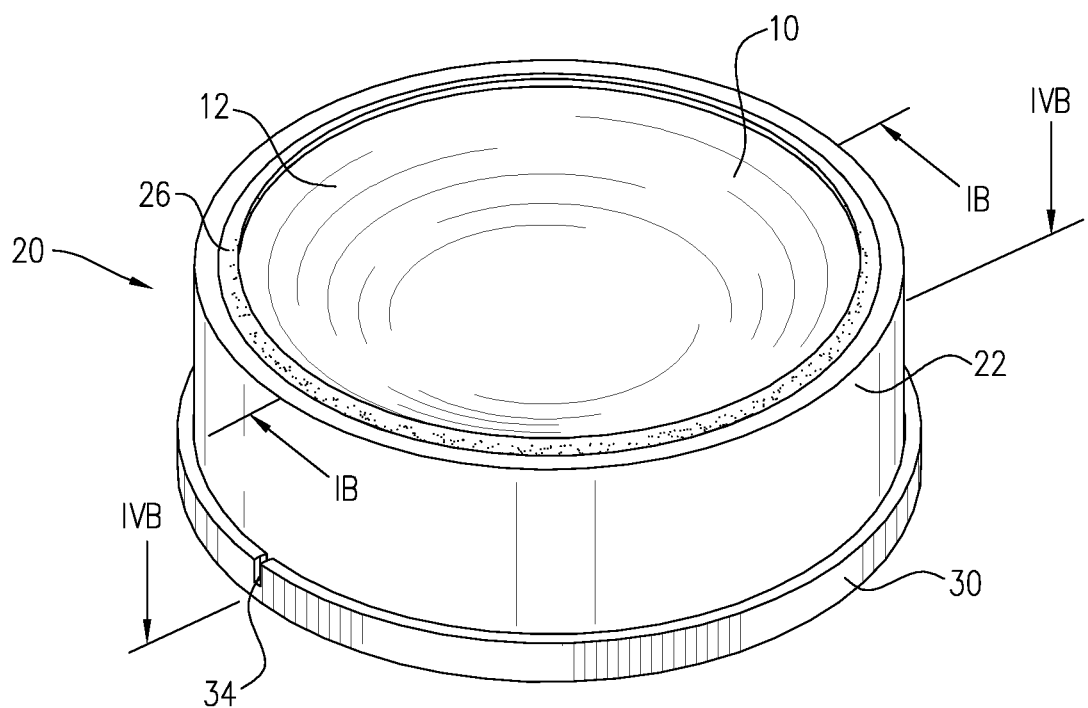
FIGS. 1A and 1B are schematic illustrations of respective views of an object placed on a vacuum-plasma jig, in accordance with some applications of the present invention.
Figure 1B:
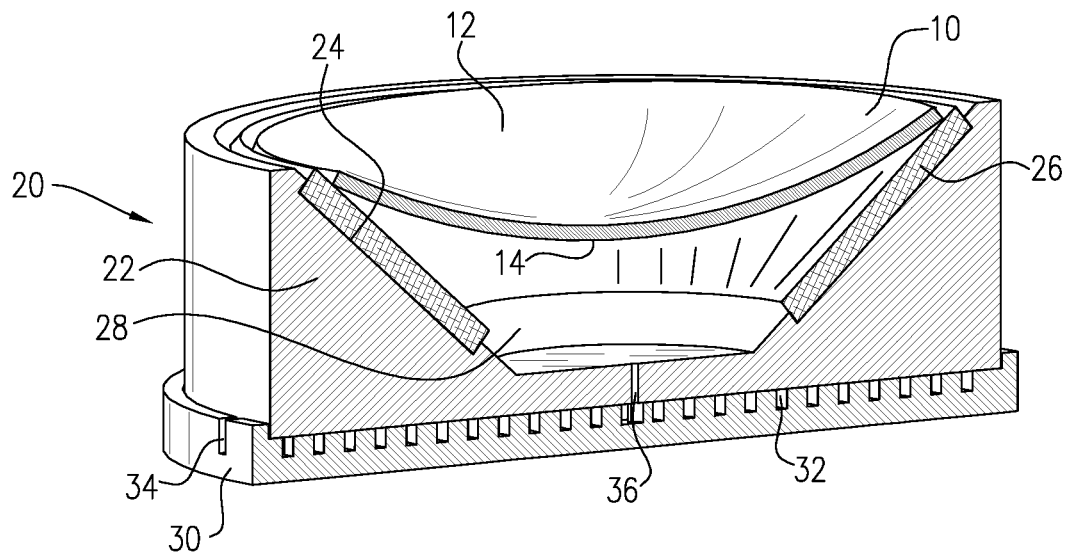

Reference is now made to FIGS. 1A and 1B, which are schematic illustrations of respective views of an object 10 placed on a vacuum-plasma jig 20, in accordance with some applications of the present invention. FIG. 1A shows a three-dimensional view of the object on the vacuum-plasma jig, and FIG. 1B shows a cross-sectional view.

In accordance with respective applications, the object may include a lens of eyeglasses, a different type of lens (e.g., a lens of machinery, a telescope, a microscope, etc.), a cover of a watch or a clock, a protective cover of a cellphone, or any other type of object. The object is typically made of glass, plastic, crystal, or any other material. For some applications, the object is a curved object that defines a concave surface 12 and a convex surface 14. Vacuum-plasma jig 20 is typically used in cases when it is desirable to apply a vacuum-plasma treatment to one surface of the object, but not apply the treatment to the other surface (or to a portion thereof). For example, this may be the case if coatings are to be applied to one of the surfaces but not to the other surface (or to a portion thereof). In such cases, it may be preferable not to apply the vacuum-plasma treatment to the other surface (or to a portion thereof) in order to avoid damage to the other surface (or to a portion thereof). By way of example, applying a plasma treatment to a hydrophobic coating layer typically results in damage to the coating that is readily observable.

One possible solution to protecting a surface of an object (or a portion thereof) from plasma treatment would be to cover it with a protective film. However, this is time-consuming and requires the use of disposables. Another possible solution would be to attach a protective chamber to the surface (or portion thereof) that is to be protected, such that the vacuum within the vacuum-plasma chamber would give rise to a vacuum seal between the protective chamber and the surface (or a portion thereof). However, the inventors have found that in such cases, after the vacuum plasma treatment has been terminated it is very difficult to remove the surface from the protective chamber because the vacuum that was created during the plasma treatment continues to hold together the protective chamber and the surface, even after an atmospheric pressure is resumed. Adding a small hole to the protective chamber (such that after resuming the atmospheric pressure at the end of the plasma treatment, it also releases the protective chamber from the protected surface) tends not to help because the plasma tends to enter the protective chamber through the hole, such that the plasma may end up damaging the surface (or portion thereof).

In accordance with some applications of the present invention, vacuum-plasma jig 20 acts as a protective chamber that protects a surface of an object (or a portion thereof) from the plasma treatment. Typically, the jig defines a long, narrow channel with the dimensions of the channel being such that the strength of any plasma entering the protective chamber is substantially weakened such that it does not damage the surface (or portion thereof) that is to be protected. Further typically, the dimensions of the channel are such that, when vacuum is applied within the vacuum-plasma chamber, the surface (or portion thereof) that is to be protected is substantially sealed with respect to the protective chamber. This is because the vacuum pressure that is applied to the vacuum-plasma chamber is imparted along the channel to the protective chamber. Still further typically, the dimensions of the channel are such that, when the vacuum within the vacuum-plasma chamber is terminated, the surface (or portion thereof) that is to be protected is readily removable from the protective chamber, due to seal between the protective chamber and the surface (or portion thereof) being weakened by inflow of air into the protective chamber via the channel.

A particular example of the invention is described with reference to FIGS. 1A-4B, the example being applicable to a curved object, and a case in which it is desired to apply a plasma treatment to the concave surface of the object but to protect the entire convex surface from the plasma treatment. Although the figures illustrate this particular example, the scope of the present invention includes applying similar apparatus and methods to any object (whether flat or curved), having any shape, and protecting any surface (or portion thereof) of such an object, mutatis mutandis.

Returning now to FIGS. 1A-B, as shown, vacuum-plasma jig 20 typically includes a receptacle 22. For some applications, an upper surface 24 of the receptacle is slanted such as to receive the convex surface of the curved object. Upper surface 24 of the receptacle is typically covered with a soft material layer 26, which is configured to be placed in direct contact with an outer portion of the convex surface of the curved object. (For some applications, a lubricant coating is disposed between soft material layer 26 and the convex surface of the curved object, as described hereinbelow.) For example, the soft material layer may be made of an elastomer, such as rubber. Typically, the material from which the soft material layer is made has a hardness of less than 90 Shore A hardness (e.g., between 10 and 85 Shore A hardness). As shown, due to the relative shapes of upper surface 24 and convex surface 14 of the curved object, when the convex surface is placed in contact with the soft material layer, there is a hollow space 28 proximate to at least a portion of the convex surface. The vacuum-plasma jig typically defines a base 30, upon which receptacle 22 is disposed. Typically, the base defines a spiral channel 32 therethrough, with a first end 34 of the spiral channel (shown in FIG. 1A) opening to an exterior of the vacuum-plasma jig, and a second end 36 of the spiral channel (shown in FIG. 1B) opening to hollow space 28 proximate to the convex surface 14 of curved object 10. (The spiral shape of channel 32 is shown in FIG. 4B.)

Figure 2:
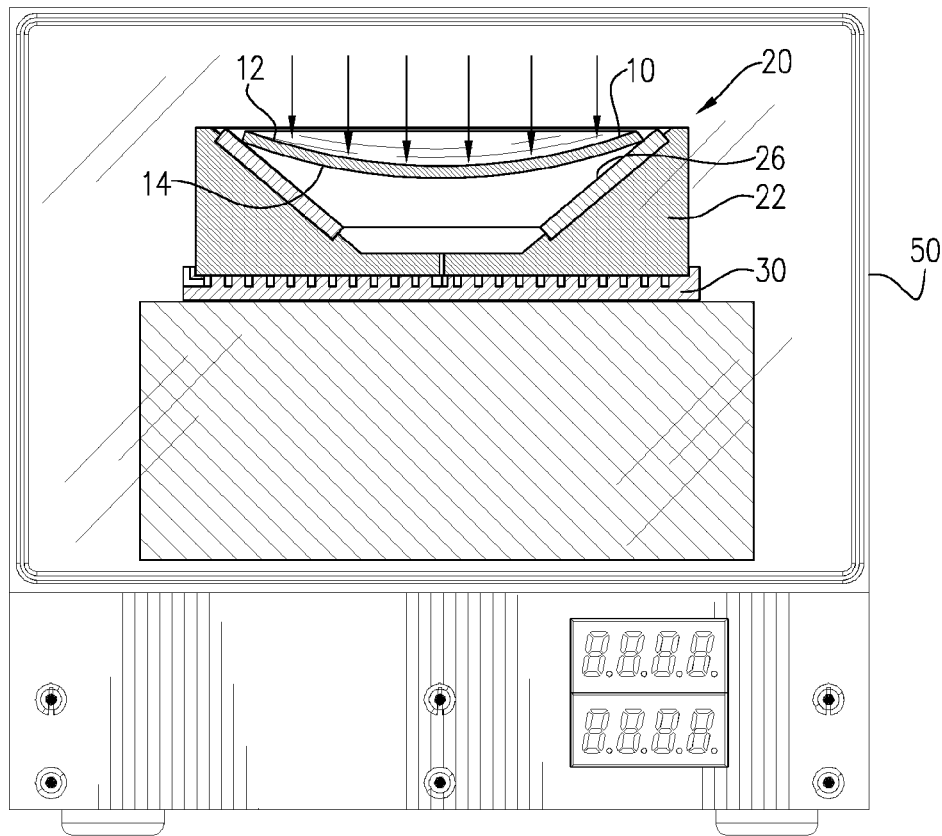
FIG. 2 is a schematic illustration showing the object placed on the vacuum-plasma jig within a vacuum-plasma chamber, during application of a vacuum-plasma treatment to a surface of the object, in accordance with some applications of the present invention.

Reference is now made to FIG. 2, which is a schematic illustration showing curved object 10 placed on vacuum-plasma jig 20 within a vacuum-plasma chamber 50 during application of a vacuum-plasma treatment to concave surface 12 of the curved object, in accordance with some applications of the present invention. Typically, during the application of the vacuum-plasma treatment to concave surface 12 of curved object 10, the entire vacuum-plasma jig 20 is placed inside vacuum-plasma chamber 50, with the curved object placed upon the vacuum-plasma jig (as shown). For some applications, prior to placing convex surface 14 on soft material layer 26, the soft-material layer is coated with a lubricant 27 (e.g., a layer of grease or gel, shown in FIG. 4A), which is configured to enhance sealing between the convex surface 14 and soft material layer 26. During the application of the treatment, air is typically pumped out from the entire vacuum-plasma chamber. Gradually, air is also removed from hollow space 28, such that the convex surface becomes sealed with respect to soft material layer 26. When the plasma starts moving inside the vacuum-plasma chamber, the convex surface 14 of curved object 10 is not exposed to the plasma treatment, because the convex surface is sealed with respect to soft material layer 26, thereby preventing exposure of the convex surface to the plasma via the outer edge of the convex surface. In addition, the inventors of the present application have found that if spiral channel 32 is sufficiently long and narrow, the plasma loses most of its power along the length of the channel, such that exposure of the convex surface to the plasma treatment via the spiral channel is insignificant and does not create any noticeable damage to convex surface 14 of the curved object 10.

Figure 3A:
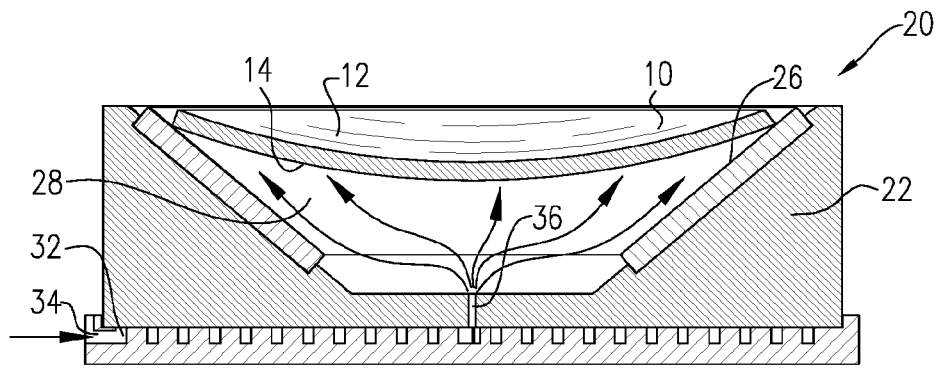
FIGS. 3A and 3B are schematic illustrations of air flowing into the vacuum-plasma jig, thereby allowing the object to be readily removed from the vacuum-plasma jig, in accordance with some applications of the present invention.
Figure 3B:
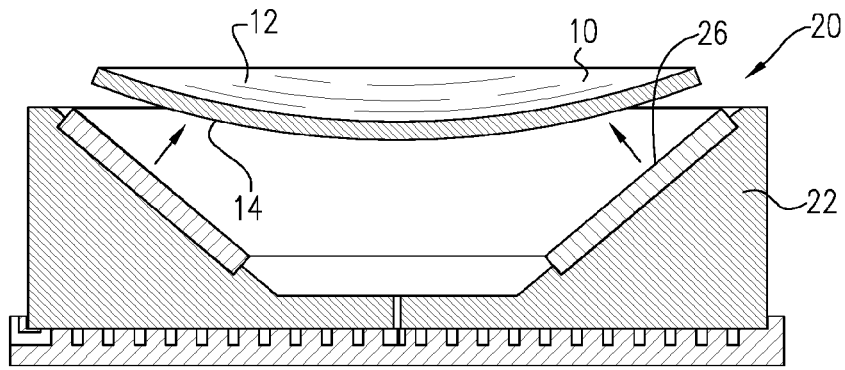

Reference is now made to FIGS. 3A and 3B, which are schematic illustrations of air flowing into vacuum-plasma jig 20, thereby allowing curved object 10 to be readily removable from the vacuum-plasma jig, in accordance with some applications of the present invention. Subsequent to the vacuum-plasma treatment having been applied to concave surface 12 of curved object 10, it is necessary to remove curved object 10 from vacuum-plasma jig 20 without damaging the curved object (e.g., by needing to apply substantial force to the curved object). It is noted that by virtue of the softness of soft material layer 26 of the jig, as well as the fact that some vacuum has typically been applied to hollow space 28 via spiral channel 32, the curved object typically becomes wedged into place with respect to the soft material layer. However, the inventors have found that, after the termination of the vacuum-plasma treatment, there is typically sufficient airflow via the spiral channel that the vacuum within hollow space 28 is removed and the curved object is readily removable from the vacuum-plasma jig, as illustrated schematically in FIGS. 3A-B.

Thus, to summarize, the spiral channel is typically configured such that (a) any exposure of the convex surface to the plasma treatment via the spiral channel is insignificant, but (b) there is typically sufficient airflow via the spiral channel that the curved object is readily removable from the vacuum-plasma jig after the termination of the vacuum-plasma treatment. Typically, the channel is configured such that the strength of any plasma entering the hollow space is substantially weakened such that it does not damage the surface (or portion thereof) that is to be protected. Further typically, the channel is configured such that, when vacuum is applied within the vacuum-plasma chamber, the surface (or portion thereof) that is to be protected is substantially sealed with respect to the receptacle (e.g. via soft material layer 26). This is because the vacuum pressure that is applied to the vacuum-plasma chamber is imparted along the channel to the hollow space. Still further typically, the channel is configured such that, when the vacuum within the vacuum-plasma chamber is terminated, the surface (or portion thereof) that is to be protected is readily removable from the receptacle, due to sealing between the receptacle and the surface (or portion thereof) being weakened by inflow of air into the hollow space via the channel.

It is noted that the spiral shape of channel 32 is typically the optimum shape for fitting a long, narrow channel within base 30 in a case of base 30 being circular (as shown). However, the scope of the present application includes the use of a channel having a different shape. The channel typically extends from outside the jig to the hollow space proximate to a surface (or portion thereof) that is to be protected. In accordance with the above description, irrespective of the shape of the channel, it is typically long and narrow. Typically, the ratio of the length of the channel in mm to the average cross-sectional area of the channel in square mm is greater than 100:1. For some applications, the channel is a long and narrow tube that extends from outside the jig to a hollow space that is proximate to a surface (or portion thereof) that is to be protected, rather than being a channel that is formed within the base.

Figure 4A:
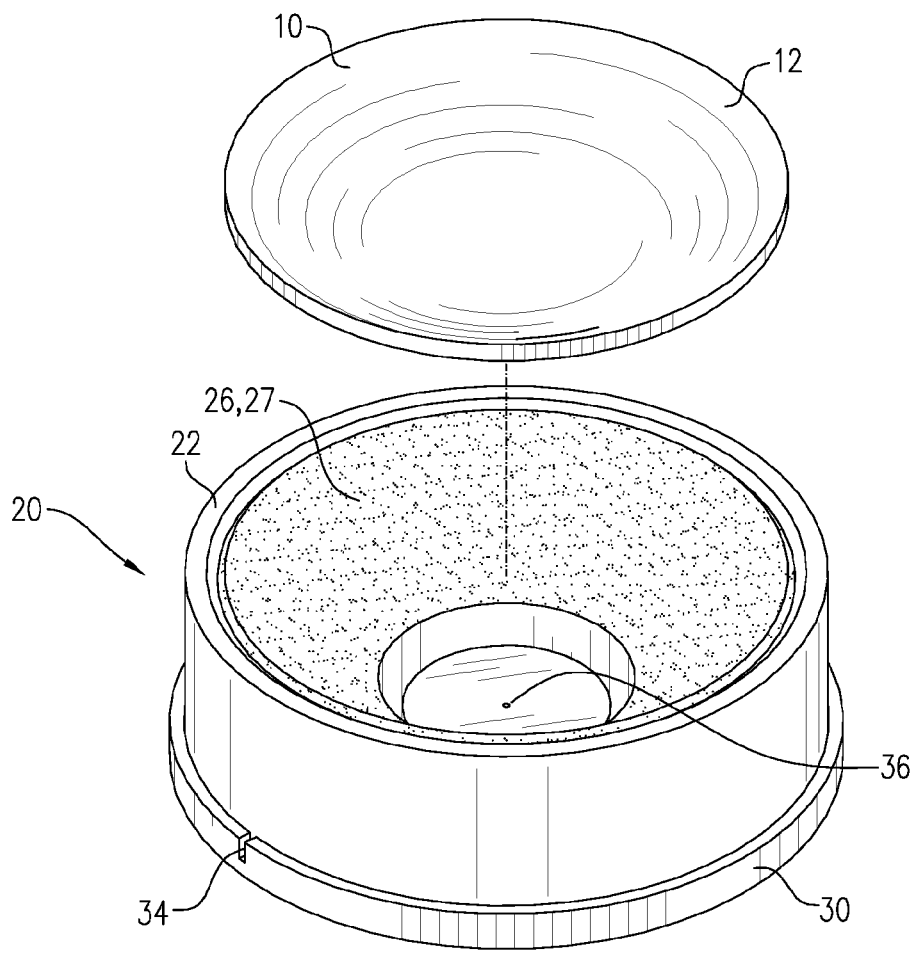
FIGS. 4A and 4B are schematic illustrations of respective views of the vacuum-plasma jig, in accordance with some applications of the present invention.
Figure 4B:
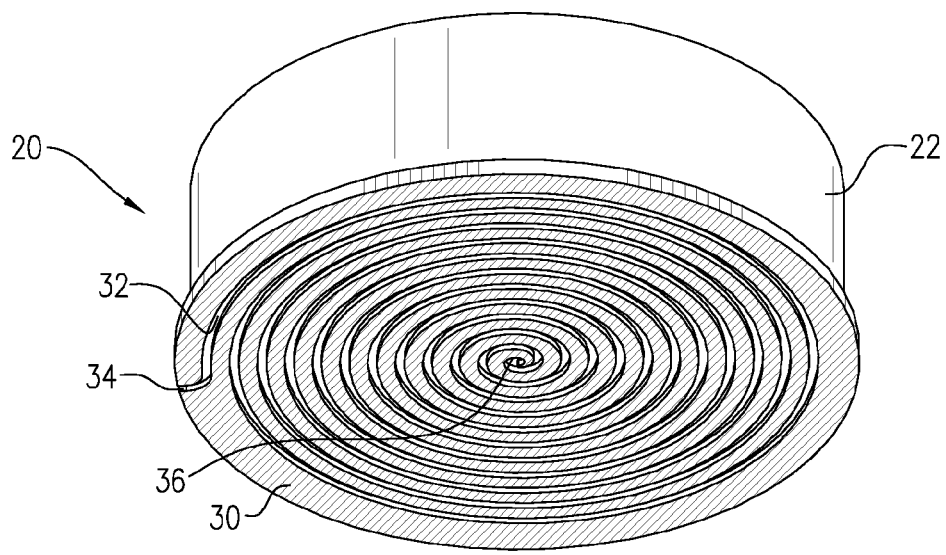

Reference is now made to FIGS. 4A and 4B, which are schematic illustrations of respective views of vacuum-plasma jig 20, which includes spiral channel 32 in its base 30, in accordance with some applications of the present invention. FIG. 4A shows a view of the jig in which both first end 34 and second end 36 of spiral channel 32 are visible, although the spiral channel itself is hidden. As described hereinabove, first end 34 of spiral channel 32 typically opens to the exterior of the vacuum-plasma jig, and second end 36 of spiral channel 32 typically opens to hollow space 28 (which is configured to be disposed proximate to convex surface 14 of curved object 10). FIG. 4B shows a view of base 30 of the vacuum-plasma jig, in which the base has been made partially transparent, such that spiral channel 32 is visible.

It is noted that although receptacle 22 and base 30 are shown as separate component, for some applications, receptacle 22 and base 30 are manufactured as a single integrated structure.

As noted hereinabove, a particular example of the invention is described with reference to FIGS. 1A-4B, the example being applicable to a curved object, and a case in which it is desired to apply a plasma treatment to the concave surface of the object but to protect the entire convex surface from the plasma treatment. Although the figures illustrate this particular example, the scope of the present invention includes applying similar apparatus and methods to any object (whether flat or curved), having any shape, and protecting any surface (or portion thereof) of such an object, mutatis mutandis. For example, the vacuum-plasma jig may be modified such as to protect only a portion of a surface, to protect a surface (or a portion thereof) of a non-curved (i.e., flat) object, to protect a concave surface (or a portion thereof) of a curved object, etc. Also as noted hereinabove, the spiral shape of channel 32 is typically the optimum shape for fitting a long, narrow channel within base 30 in a case of base 30 being circular (as shown). However, the scope of the present application includes the use of a channel having a different shape (e.g., a 2D shape, or a 3D shape), such as a zigzag shape, a meandering shape, or a wave shape. The channel typically extends from outside the jig to a hollow space that is proximate to a surface (or portion thereof) that is to be protected. For some applications, the channel extends at least partially through a portion of the vacuum-plasma jig other than the base. For example, the channel may extend at least partially through receptacle 22. In accordance with the above description, irrespective of the shape of the channel, it is typically long and narrow. Typically, the ratio of the length of the channel in mm to the average cross-sectional area of the channel in square mm is greater than 100:1.

It will be appreciated by persons skilled in the art that the present invention is not limited to what has been particularly shown and described hereinabove. Rather, the scope of the present invention includes both combinations and subcombinations of the various features described hereinabove, as well as variations and modifications thereof that are not in the prior art, which would occur to persons skilled in the art upon reading the foregoing description.

The invention claimed is:

1. Apparatus for use with an object having first and second surfaces and a vacuum-plasma chamber, the apparatus comprising:
    a vacuum-plasma-jig configured to receive the object during application of a vacuum plasma-treatment to the first surface of the object within the vacuum-plasma chamber, the vacuum-plasma jig comprising:
        a receptacle configured to receive at least a portion of the second surface of the object when the second surface is placed upon the receptacle; and
        a base upon which the receptacle is disposed,
        wherein:
            the receptacle and base are shaped such that when the receptacle receives the portion of the second surface of the object, there is a hollow space proximate to the portion of the second surface of the object, and
            the jig defines a channel therethrough, a first end of the channel opening to an exterior of the vacuum-plasma-jig and a second end of the channel opening to the hollow space, a ratio of a length of the channel in mm to a mean cross-sectional area of the channel in square mm being greater than 100:1.

2. The apparatus according to claim 1, wherein the channel is shaped as a spiral.

3. The apparatus according to claim 1, wherein the channel is defined through the base, a first end of the channel opening to an exterior of the base and a second end of the channel opening to the hollow space.

4. The apparatus according to claim 1, wherein the channel comprises a tube, a first end of the tube opening to an exterior of the vacuum-plasma-jig and a second end of the tube opening to the hollow space.

5. The apparatus according to claim 1, wherein the channel is configured such that a strength of any plasma entering the hollow space is substantially weakened such that it does not damage the portion of the second surface.

6. The apparatus according to claim 1, wherein the receptacle is configured to receive the entire second surface of the object when the second surface is placed upon the receptacle.

7. The apparatus according to claim 1, wherein the receptacle is covered with a soft material layer that is configured to receive at least the portion of the second surface.

8. The apparatus according to claim 1, wherein the channel is configured such that, when vacuum is applied within the vacuum-plasma chamber, the portion of the second surface is substantially sealed with respect to the receptacle.

9. The apparatus according to claim 8, wherein the channel is configured such that, when the vacuum within the vacuum-plasma chamber is terminated, the portion of the second surface is readily removable from the receptacle, due to sealing between the receptacle and the second surface being weakened by inflow of air into the hollow space via the channel.

10. The apparatus according to claim 1, wherein the object comprises a curved object that defines a concave surface and a convex surface.

11. The apparatus according to claim 10, wherein the vacuum-plasma-jig is configured to receive the object during application of the vacuum plasma-treatment to the concave surface of the object within the vacuum-plasma chamber, and the receptacle is configured to receive a portion of the convex surface of the object when the convex surface is placed upon the receptacle.

12. The apparatus according to claim 10, wherein the vacuum-plasma-jig is configured to receive the object during application of the vacuum plasma-treatment to the convex surface of the object within the vacuum-plasma chamber, and the receptacle is configured to receive a portion of the concave surface of the object when the concave surface is placed upon the receptacle.

13. The apparatus according to claim 10, wherein the curved object includes a lens that defines a concave surface and a convex surface, and wherein the vacuum-plasma-jig is configured to receive the lens during application of a vacuum plasma-treatment to the concave surface of the lens within the vacuum-plasma chamber.

14. The apparatus according to claim 10, wherein the curved object includes a lens that defines a concave surface and a convex surface, and wherein the vacuum-plasma-jig is configured to receive the lens during application of a vacuum plasma-treatment to the convex surface of the lens within the vacuum-plasma chamber.

15. A method for use with an object having first and second surfaces, the method comprising:
    placing the object on a receptacle of a vacuum-plasma-jig such that at least a portion of the second surface of the object is received by the receptacle,
    wherein:
        the vacuum-plasma jig additionally includes a base, and the receptacle and base are shaped such that when the receptacle receives the portion of the second surface of the object, there is a hollow space proximate to the portion of the second surface of the object, and
        the vacuum-plasma jig defines a channel therethrough, a first end of the channel opening to an exterior of the vacuum-plasma-jig and a second end of the channel opening to the hollow space, a ratio of a length of the channel in mm to a mean cross-sectional area of the channel in square mm being greater than 100:1; and
    applying a vacuum plasma-treatment to the first surface of the object within a vacuum-plasma chamber, while the portion of the second surface of the object is received by the receptacle.

16. The method according to claim 15, wherein the channel is shaped as a spiral.

17. The method according to claim 15, wherein the channel is defined through the base, a first end of the channel opening to an exterior of the base and a second end of the channel opening to the hollow space.

18. The method according to claim 15, wherein the channel includes a tube, a first end of the tube opening to an exterior of the vacuum-plasma-jig and a second end of the tube opening to the hollow space.

19. The method according to claim 15, wherein the channel is configured such that a strength of any plasma entering the hollow space is substantially weakened such that it does not damage the portion of the second surface.

20. The method according to claim 15, wherein the receptacle is configured to receive the entire second surface of the object when the second surface is placed upon the receptacle.

21. The method according to claim 15, wherein the channel is configured such that, when vacuum is applied within the vacuum-plasma chamber, the portion of the second surface is substantially sealed with respect to the receptacle.

22. The method according to claim 21, wherein the channel is configured such that, when the vacuum within the vacuum-plasma chamber is terminated, the portion of the second surface is readily removable from the receptacle, due to sealing between the receptacle and the second surface being weakened by inflow of air into the hollow space via the channel.

23. The method according to claim 15, wherein the object includes a curved object that defines a concave surface and a convex surface.

24. The method according to claim 23, wherein the vacuum-plasma-jig is configured to receive the object during application of the vacuum plasma-treatment to the concave surface of the object within the vacuum-plasma chamber, and the receptacle is configured to receive a portion of the convex surface of the object when the convex surface is placed upon the receptacle.

25. The method according to claim 23, wherein the vacuum-plasma-jig is configured to receive the object during application of the vacuum plasma-treatment to the convex surface of the object within the vacuum-plasma chamber, and the receptacle is configured to receive a portion of the concave surface of the object when the concave surface is placed upon the receptacle.

26. The method according to claim 23, wherein the curved object includes a lens that defines a concave surface and a convex surface, and wherein the vacuum-plasma-jig is configured to receive the lens during application of a vacuum plasma-treatment to the concave surface of the lens within the vacuum-plasma chamber.

27. The method according to claim 23, wherein the curved object includes a lens that defines a concave surface and a convex surface, and wherein the vacuum-plasma-jig is configured to receive the lens during application of a vacuum plasma-treatment to the convex surface of the lens within the vacuum-plasma chamber.

28. The method according to claim 15, wherein placing the object on a receptacle of a vacuum-plasma-jig such that at least a portion of the second surface of the object is received by the receptacle comprises placing the object on a soft material layer that is configured to receive at least the portion of the second surface.

29. The method according to claim 28, further comprising coating the soft material layer with a lubricant prior to placing the object on the receptacle of the vacuum-plasma-jig, the lubricant being configured to form a seal between the portion of the second surface of the object and the soft material layer.

* * * * *